United States Patent
Fritsche et al.

(10) Patent No.: US 7,578,642 B2
(45) Date of Patent: Aug. 25, 2009

(54) FLEXIBLE SINGLE RAIL DRILLING SYSTEM

(75) Inventors: David L. Fritsche, Foristell, LA (US); Thomas P. Von Minden, Chesterfield, MT (US)

(73) Assignee: The Boeing Corporation, Chicago, IL (US)

(*) Notice: Subject to any disclaimer, the term of this patent is extended or adjusted under 35 U.S.C. 154(b) by 663 days.

(21) Appl. No.: 11/198,942

(22) Filed: Aug. 5, 2005

(65) Prior Publication Data

US 2007/0036618 A1 Feb. 15, 2007

(51) Int. Cl.
*B21B 15/00* (2006.01)
*B23P 17/00* (2006.01)
*B25C 5/02* (2006.01)
*B25C 7/00* (2006.01)
*B26D 3/00* (2006.01)
*B25B 11/00* (2006.01)
*B23B 47/00* (2006.01)

(52) U.S. Cl. .................. 408/76; 29/33 R; 29/423; 83/56; 83/100; 227/110; 227/142; 269/21; 408/10; 408/88; 408/98

(58) Field of Classification Search ............ 29/33 R, 29/423; 83/56, 100; 227/110, 142; 269/21; 409/1 R, 10, 14, 56, 76, 88, 98, 8, 13, 67, 409/77, 79

See application file for complete search history.

(56) References Cited

U.S. PATENT DOCUMENTS

| | | | |
|---|---|---|---|
| 3,575,364 A | | 4/1971 | Frederick |
| 4,850,763 A | | 7/1989 | Jack et al. |
| 6,382,889 B1 | * | 5/2002 | Brown et al. ............... 409/175 |
| 6,467,385 B1 | * | 10/2002 | Buttrick et al. ............... 83/745 |
| 6,494,307 B1 | | 12/2002 | Kozak |
| 6,776,562 B2 | | 8/2004 | Morrison et al. |
| 6,843,328 B2 | | 1/2005 | Boyl-Davis et al. |
| 6,926,094 B2 | * | 8/2005 | Arntson et al. ............... 173/32 |
| 7,216,408 B2 | * | 5/2007 | Boyl-Davis et al. .......... 29/33 R |
| 7,406,758 B2 | * | 8/2008 | Jones et al. ................ 29/34 B |
| 2002/0168241 A1 | * | 11/2002 | David et al. ................ 409/178 |
| 2004/0265078 A1 | * | 12/2004 | Boyl-Davis et al. .......... 408/1 R |
| 2005/0265798 A1 | * | 12/2005 | Boyl-Davis et al. ............ 408/76 |
| 2006/0032554 A1 | * | 2/2006 | Sprague et al. ............. 144/365 |
| 2008/0181733 A1 | * | 7/2008 | Wright et al. ............... 408/1 R |

FOREIGN PATENT DOCUMENTS

| | | |
|---|---|---|
| EP | 0 213 493 | 3/1987 |
| GB | 1 286 793 | 8/1972 |

\* cited by examiner

*Primary Examiner*—David P Bryant
*Assistant Examiner*—Alexander P Taousakis
(74) *Attorney, Agent, or Firm*—Harness, Dickey & Pierce, P.L.C.

(57) ABSTRACT

An apparatus having a single, elongated flexible rail with a plurality of attachment devices connected to the rail and spaced at intervals therealong for releasably affixing the rail to a surface of a work piece by vacuum. The rail bends and twists as needed to substantially follow the surface of the work piece. An X-axis carriage is coupled to the rail and adapted to traverse the rail along an X-axis, wherein the X-axis is parallel to a length of the rail. A Y-axis carriage is coupled to the X-axis and adapted to traverse the X-axis carriage along a Y-axis, wherein the Y-axis is perpendicular to the X-axis. A fastening device clamps the X-axis carriage to the Y-axis carriage. A laser associated with the X-axis carriage facilitates precise locating of a drill carried by the apparatus relative to a spot where a hole is to be drilled.

14 Claims, 9 Drawing Sheets

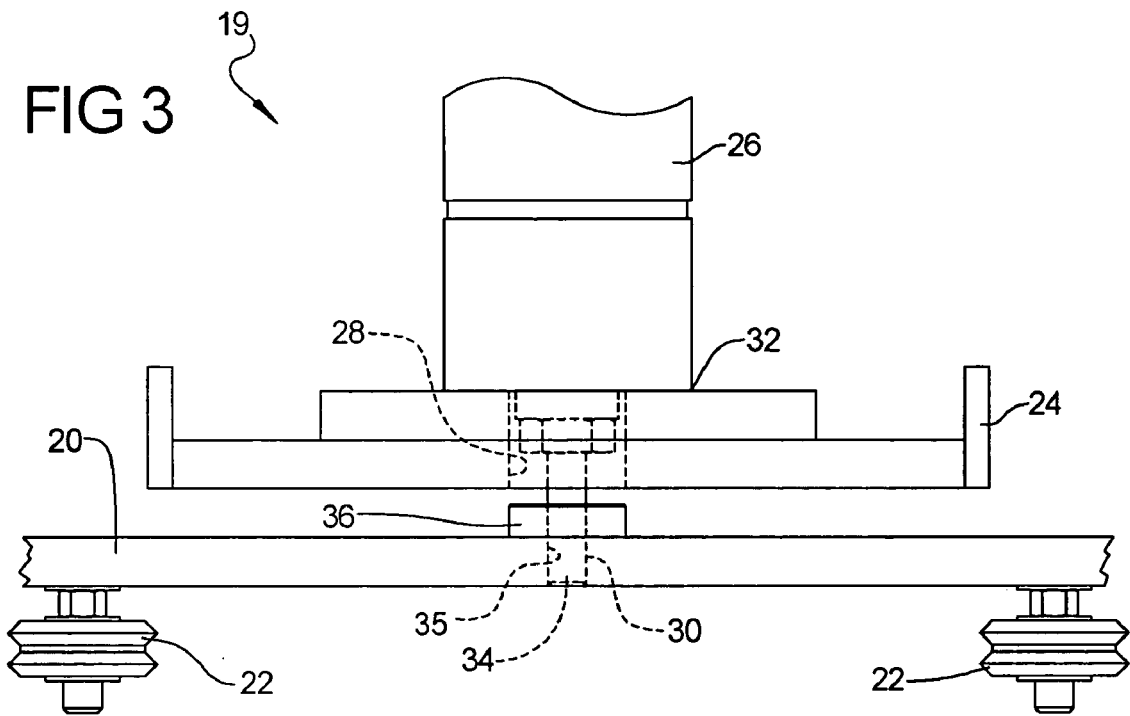
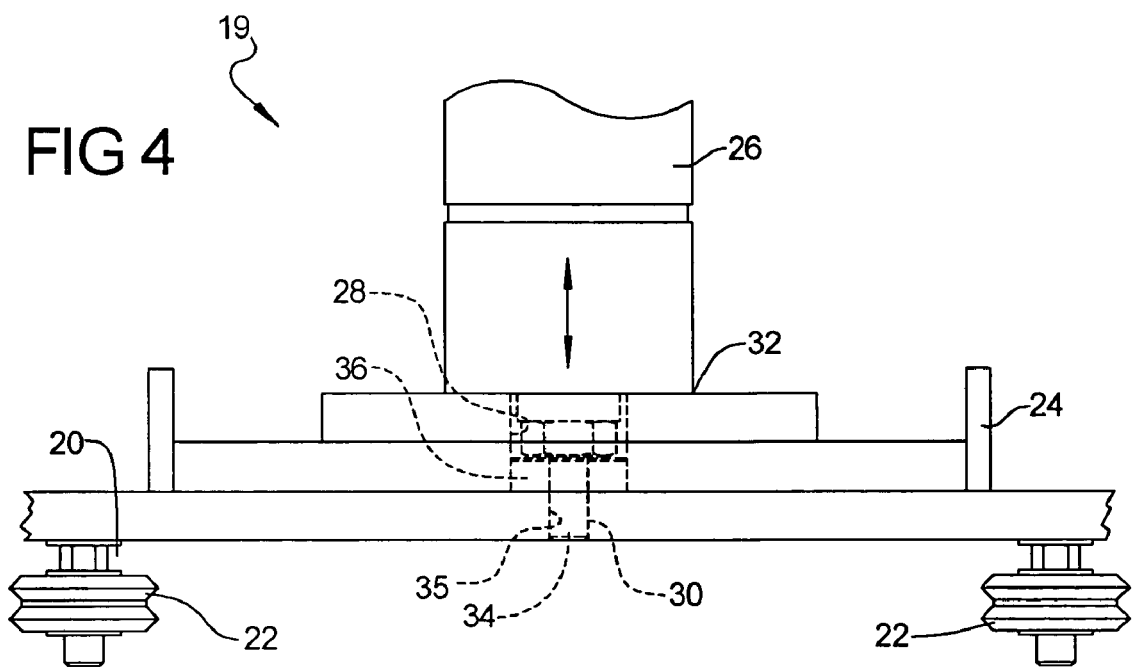

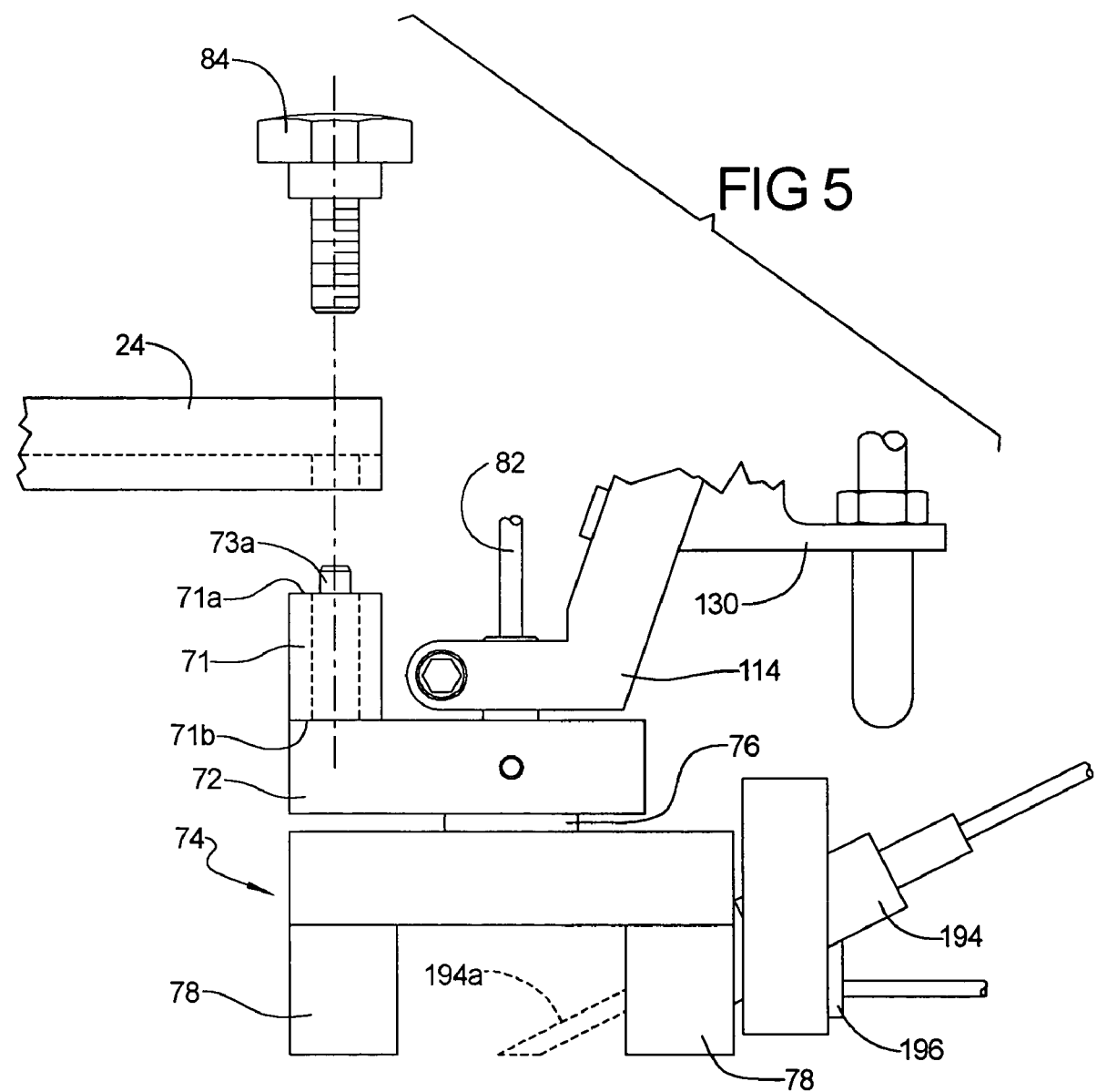

FLEXIBLE SINGLE RAIL DRILLING SYSTEM

FIELD

The present disclosure relates to machines for drilling or performing other work operations on large work pieces configured as simple- or compound-contoured panels or the like, such as wing and fuselage sections for an aircraft. The disclosure relates more particularly to a flexible track machine and method for positioning a machining device such as a drill, marking device, or the like, relative to a work piece by traversing the machining device along a track mounted on and indexed to the work piece.

BACKGROUND

The problem of accurately drilling holes in large work pieces such as aircraft wing and fuselage panels and other types of structures has been an ongoing challenge in the aircraft industry as well as other industries. A particular challenge is being able to drill holes in a wide range of work piece configurations. Large fixed-mounted machines such as five-axis drilling machines can be used for some types of work pieces, but these machines are quite expensive to procure and operate. In contrast, a relatively low-cost solution to the above-noted problem that has been developed by the assignee of the present application is to mount an automated drill or other machining device on a tract that is mounted to the work piece. The drill or machining device is supported on a carriage that travels along the track, which is formed by a pair of parallel rails mounted on the work piece. For examples of such devices, see U.S. Pat. No. 4,850,763, assigned to the assignee of the present application, and incorporated herein by reference, and U.S. Pat. Nos. 3,575,364, and 6,843,328 B2 also incorporated by reference herein.

With many prior devices, such devices were applied to work pieces that did not have compound-contoured surfaces. As used herein, the term "compound-contoured" (also known as "doubly curved") is used to denote a surface having curvature in more than one direction. On such a compound-contoured surface, it is possible in general to lay a pair of straight, flexible rails such that the rails conform to the surface contour and are the same distance apart at all points along the rails. Thus, the surface of a sphere is an example of a compound-contoured surface, because the rails can be laid in circumferential, axial, or helical directions and the spacing between them can be constant.

With other previously developed devices, a pair of flexible rails is mounted in the circumferential direction around a circular cylindrical work piece. It will be appreciated that the rails were made flexible so that they can conform to a variety of surfaces, but even such flexible rails cannot be positioned exactly the same distance apart at all points along the rails when they are mounted on a compound-contoured surface. Furthermore, the rails mounted along two different paths on a compound-contoured surface will twist differently from one another because of the different directions of the surface normal along the two paths. This can make it difficult to traverse a carriage along the rails and maintain acceptable accuracy of carriage positioning.

With some previously developed devices, a pair of spaced rails is mounted on a compound-contoured surface such that the rails are the same distance apart at all points along the rails. A Y-axis motor and an X-axis motor are supported on a carriage unit that is free to move along the rails. Additionally, the rails are mounted to the surface via vacuum cups. One drawback with such systems is that the rails and the carriage system may not provide enough stability during drilling in order to drill precise holes in a work piece. Moreover, the cost of fabricating drill plates is very costly for this type of two-rail drilling system because a drill plate is made for one specific area of the work piece. Additionally, each drill plate must be made to match the mode line contour of the work piece and establish an exact hole location. Therefore, it is desirable to have a rail system with fewer parts so that an operator can even more easily set up the drilling rail system for use. Additionally, a drilling rail system is needed which provides even better adhesion over seams and holes located on the surface of the work piece, to enable even more accurate and precise holes to be formed in the work piece.

SUMMARY

In accordance with the present disclosure, an apparatus is provided for forming holes in a work piece. In one preferred embodiment, the apparatus includes a single, elongated flexible rail including a plurality of attachment devices adapted to releasably attach the rail to a work piece. The rail has a longitudinal axis and a transverse axis. The apparatus further includes a main carriage operatively coupled to the rail to be longitudinally moveable. A secondary carriage operatively coupled to the main carriage to be transversely moveable and adapted to receive a machining device. Additionally, the apparatus comprises a fastening device coupling the main carriage and the secondary carriage and adapted to clamp the secondary carriage downward to the main carriage. The main carriage and the secondary carriage are substantially braced against one another to prevent the secondary carriage from moving along the Y-axis.

The present disclosure is advantageous in that it forms a system that can be used for supporting and locating a power feed motor on a mobile platform structure without dedicated tooling, such as drill plates, for a specific surface and/or a work piece, and through the use of a single flexible rail. Additionally, the present disclosure is compatible with a wide variety of contours and hole patterns often used in construction of aircraft and other mobile platforms.

The features, functions, and advantages can be achieved independently in various embodiments of the present disclosures or may be combined in yet other embodiments.

BRIEF DESCRIPTION OF THE DRAWINGS

The present disclosure will become more fully understood from the detailed description and the accompanying drawings, wherein:

FIG. 3 is a cross-sectional view of a carriage system in accordance with a preferred embodiment of the present disclosure;

FIG. 4 is a cross-sectional view similar to FIG. 3, wherein a Y-axis carriage is clamped to an X-axis carriage;

FIG. 5 is an exploded view of a fastening device coupling the carriage system to a machining device;

DETAILED DESCRIPTION

The following description of various embodiments is merely exemplary in nature and is in no way intended to limit the disclosure, its application, or uses. This disclosure may, however, be embodied in many different forms and should not be construed as limited to the specific embodiments set forth herein.

Figure 1:
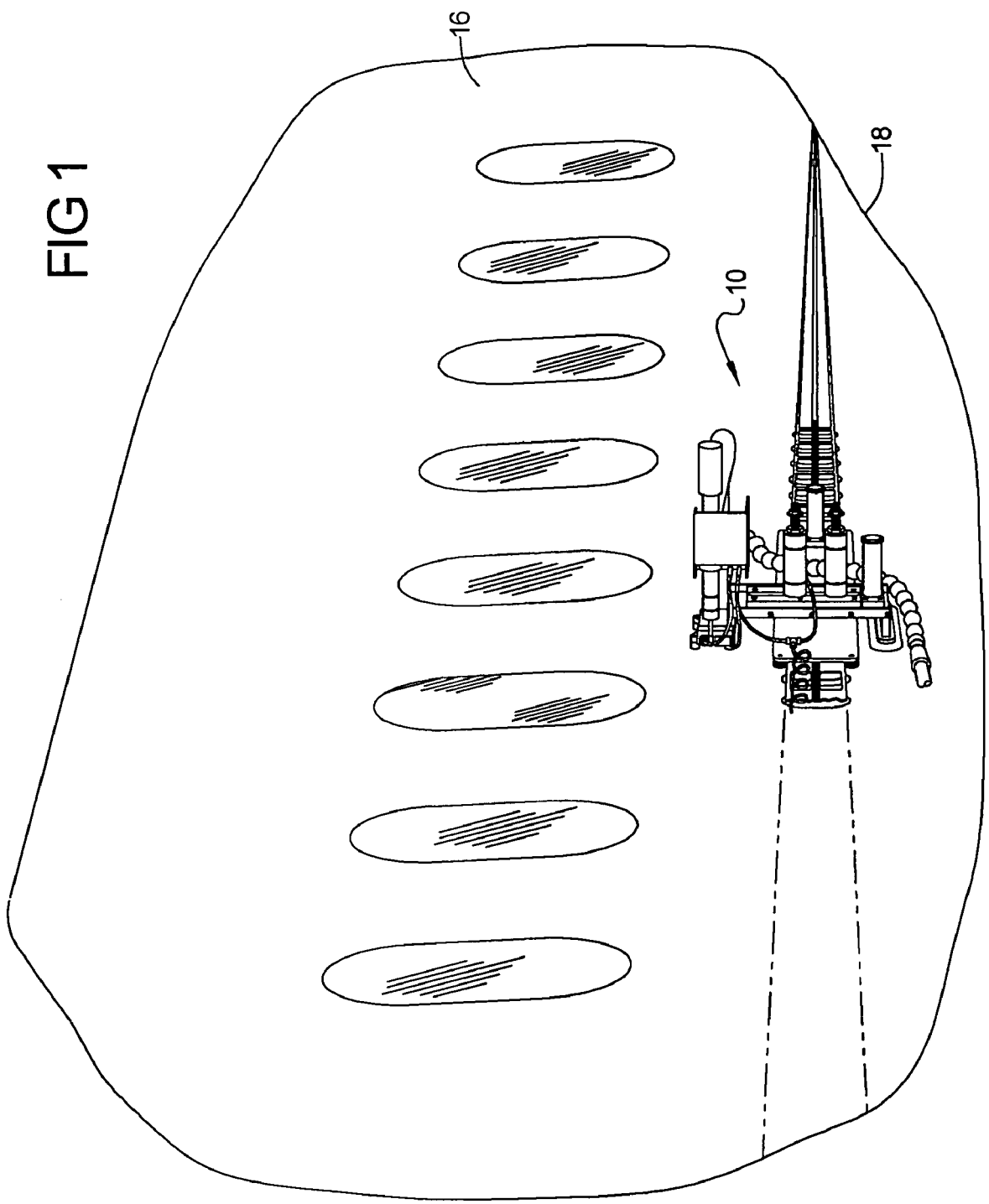
FIG. 1 is a perspective view of a vacuum mounted drilling apparatus in accordance with a preferred embodiment of the present disclosure.
Figure 2:
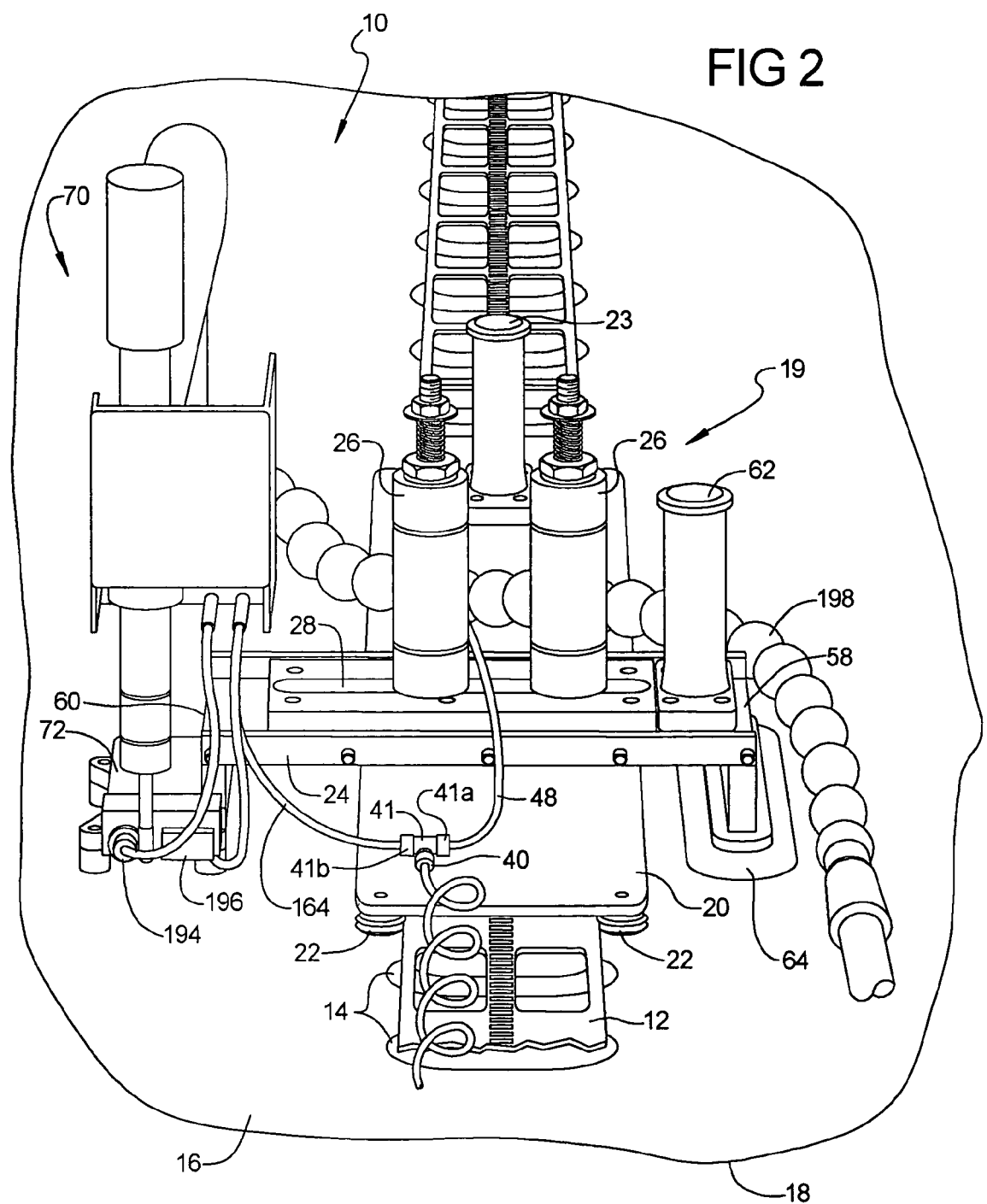
FIG. 2 is a perspective view of the vacuum mounted drilling apparatus of FIG. 1.

With reference to FIGS. 1-2, a vacuum mounted drilling system, apparatus or machine 10 in accordance with an embodiment of the disclosure is shown. Machine 10 comprises a rail 12 to which a plurality of attachment devices 14, preferably fixed in the form of vacuum cup assemblies, are releasably affixed at spaced intervals along the length of rail 12. Additionally, rail 12 preferably includes a ratio of two vacuum cups for every vacuum generator to improve adhesion over seams and holes on a surface 16 of a work piece 18. Rail 12 preferably has a width substantially greater than its thickness. This makes the rail 12 substantially stiffer in bending about an axis that extends in the thickness direction than the rail 12 is about an axis that extends in the width direction.

The width of rail 12 extends substantially parallel to surface 16 of work piece 18 when vacuum cup assemblies 14 are attached to surface 16. Because rail 12 is able to easily bend about the widthwise directions and to twist about its longitudinal axes, rail 12 flexes and twists as needed to substantially follow surface 16 of work piece 18. In other words, rail 12 is configured to a topography or geometry of surface 16 of work piece 18 in a spaced relationship. Vacuum cup assemblies 14 maintain rail 12 at a substantially constant distance from surface 16 of work piece 18. In this manner, the major surfaces of rail 12 are substantially parallel to surface 16 of work piece 18 at any point along rail 12.

Mounted on rail 12 is a carriage system 19. Carriage system 19 includes a main or X-axis carriage 20 and a secondary or Y-axis carriage 24. X-axis carriage 20 slides along rail 12 by virtue of rollers 22 that are mounted on X-axis carriage 20 and that engage rail 12. X-axis carriage 20 comprises a plate-shaped member. Rollers 22 are mounted along each of the opposite side edges of X-axis carriage 20. Vacuum mounted drilling machine 10 enables X-axis carriage 20 to traverse rail 12 along the X-axis (i.e., the X-axis or longitudinal axis is parallel to the length direction of rail 12) even though rail 12 may be bending and twisting. In effect, rail 12 conforms to the contour of work piece surface 16 and thus remains approximately parallel to surface 16 at any point along the path defined by rail 12.

Rail 12 is received between opposing rollers 22. Rail 12 preferably has V-shaped edges engaged by rollers 22, and rollers 22 are V-grooved rollers 22 that receive the V-shaped edges of rail 12. Rollers 22 thus prevent relative movement between rollers 22 and rail 12 in the direction along the rotational axes of rollers 22, which are substantially normal to work piece surface 16. Additionally, an X-axis handle 23 is coupled to X-axis carriage 20 in order to aid an operator to position X-axis carriage 20 to a desired location along the X-axis.

Y-axis carriage 24 is slidably mounted atop X-axis carriage 20, so that Y-axis carriage 24 can slide back and forth along a Y-axis or transverse axis direction perpendicular to the X-axis direction, wherein the Y-axis is parallel to the width direction of rail 12. More particularly, a fastening device 26 couples X-axis carriage 20 to Y-axis carriage 24. Additionally, fastening device 26 is adapted to clamp Y-axis carriage 24 downward to X-axis carriage 20. This causes X-axis carriage 20 and Y-axis carriage 24 to brace against one another to prevent Y-axis carriage 24 from moving along the Y-axis. Fastening device 26 comprises a pair of double acting cylinders 26 seated adjacent to an elongated U-shaped channel 28 formed in Y-axis carriage 24. Each double acting cylinder 26 may be any conventional double acting cylinder, such as a 1-½" Bore Air Cylinder, Model No. 172-DXDEH, manufactured by the Bimba Manufacturing Company of Monee, Ill.

As shown in FIGS. 3 and 4, each double acting cylinder 26 includes an air-driven piston (not shown), having a first side and a second side. A first piston rod 30, coupled to the air-driven piston, extends from a front portion 32 of each double acting cylinder 26. First piston rod 30 of each double acting cylinder 26 is extended through U-shaped channel 28 and coupled to X-axis carriage 20. Furthermore, first piston rod 30 is coupled to X-axis carriage 20 via a threaded portion (not shown) at a forward end 34 of first piston rod 30 which is extended through and screwed into a threaded nut 36 and into a threaded hole 35 in X-axis carriage 20, as shown in FIGS. 3 and 4.

With further reference to FIG. 2, Y-axis carriage 24 includes a first side 58 and a second side 60. A Y-axis handle 62 is coupled atop Y-axis carriage 24 and located on first side 58. Y-axis handle 62 is operative to slide Y-axis carriage 24 between first piston rod 30 of each double acting cylinder 26. Furthermore, located beneath first side 58 of Y-axis carriage 24, a coupling device 64 is affixed to Y-axis carriage 24. Coupling device 64 is adaptive to substantially affix Y-axis carriage 24 to work piece 18 by vacuum. In other words, coupling device 64 is operative to anchor carriage system 19 to work piece 18 and prevent carriage system 19 from moving along the X-axis. Additionally, coupling device 64 is preferably in the form of a vacuum cup assembly. Coupled to vacuum cup assembly 64 is a vacuum generator (not shown) to activate vacuum cup assembly 64.

Mounted onto X-axis carriage 20 and coupled to double acting cylinders 26 is a controller (not shown). Additionally, a first fluid supply line 40 is coupled to a T-fitting 41, such as an air fitting (FIG. 2). In general, first fluid supply line 40 supplies fluid, such as compressed air, to T-fitting 41 via an air supply (not shown). A second fluid supply line 48 is coupled to the input of the controller and a first outlet 41a of T-fitting 41. The controller includes an input (not shown), while also including a first-air output (not shown), a second-air output (not shown), a third-air output (not shown), and a fourth-air output (not shown). Inside the controller, the input of the controller is coupled to a first valve (not shown) and a second valve (not shown). The first valve and the second valve may include any two suitable four-way pneumatic air valves, such as two four-way pneumatic valves Part No. D20-DM-AM-A manufactured by Dynamco, Inc. of Commerce, Ga. The first valve includes a first valve input, the first-air output, and the second-air output. Additionally, the second valve includes a second valve input, the third-air output, and the fourth-air output.

Additionally, the controller includes two operator-initiated controls (not shown), a first-actuating control and a second-actuating control. The first-actuating control and the second-actuating control may include any suitable manually operated 4-way valve such as a valve Part No. D20DMAMA manufactured by Dynamco, Inc. The first-actuating control is coupled to the first valve. The first-actuating control is operative to channel fluid from the first-air output to the second-air output and vice versa. The second-actuating control is coupled to the second valve. The second-actuating control is operative to channel fluid away from the third-air output to the fourth-air output and vice versa.

A first-air-output line (not shown) is coupled to the first-air output and vacuum cup assembly 64. The first-air-outlet line provides fluid to the vacuum cup assembly. A second-air-output line (not shown) is coupled to the second-air output of the controller and front portion 32 of each double acting cylinder 26. The second-air-outlet line provides fluid to the first side of the air-driven piston through front portion 32 of each double acting cylinder 26. A third-air-output line (not shown) is coupled to the third-air output of the controller and the rear portion of each double acting cylinder 26. Additionally, the third-air-output line provides fluid to the second side of the air-driven piston through the rear portion of each double acting cylinder 26. A fourth-air-output line (not shown) is coupled to the fourth-air output of the controller and the vacuum generator of vacuum cup assembly 64. The fourth-air-output line provides fluid to the vacuum generator.

Referring to FIG. 2, air fitting 41 is constantly powered or pressurized by the air coming from the air supply via first fluid supply line 40. Therefore, second fluid supply line 48 provides a constant source of pressurized air or power to the controller. Additionally, the controller allows the constant pressure of air provided through second fluid supply line 48 to travel through the controller and out the second-air output to the rear portion of each double acting cylinder 26. Due to the air being constantly supplied to each double acting cylinder 26, the air-driven piston is placed in an extended or forward position.

Mounted to second side 60 of the Y-axis carriage 24 is a power tool assembly or machining device 70 adapted to manipulate surface 16 of work piece 18. As shown in FIG. 5, machining device 70 may be temporarily coupled to second side 60 of Y-axis carriage 24 via an attachment fixture 84, such as a tooling knob. As shown in FIGS. 5 and 8-11 of the drawings, machining device 70 is illustrated to include an attachment member 71, a drilling plate 72, a mounting unit 74, and a power feed attachment 86, which is constructed in accordance with the teachings of the present disclosure and that of U.S. Pat. No. 6,776,562, and herein incorporated by reference, and a power tool 88, which, in the example provided is a drill 88.

Figure 6:
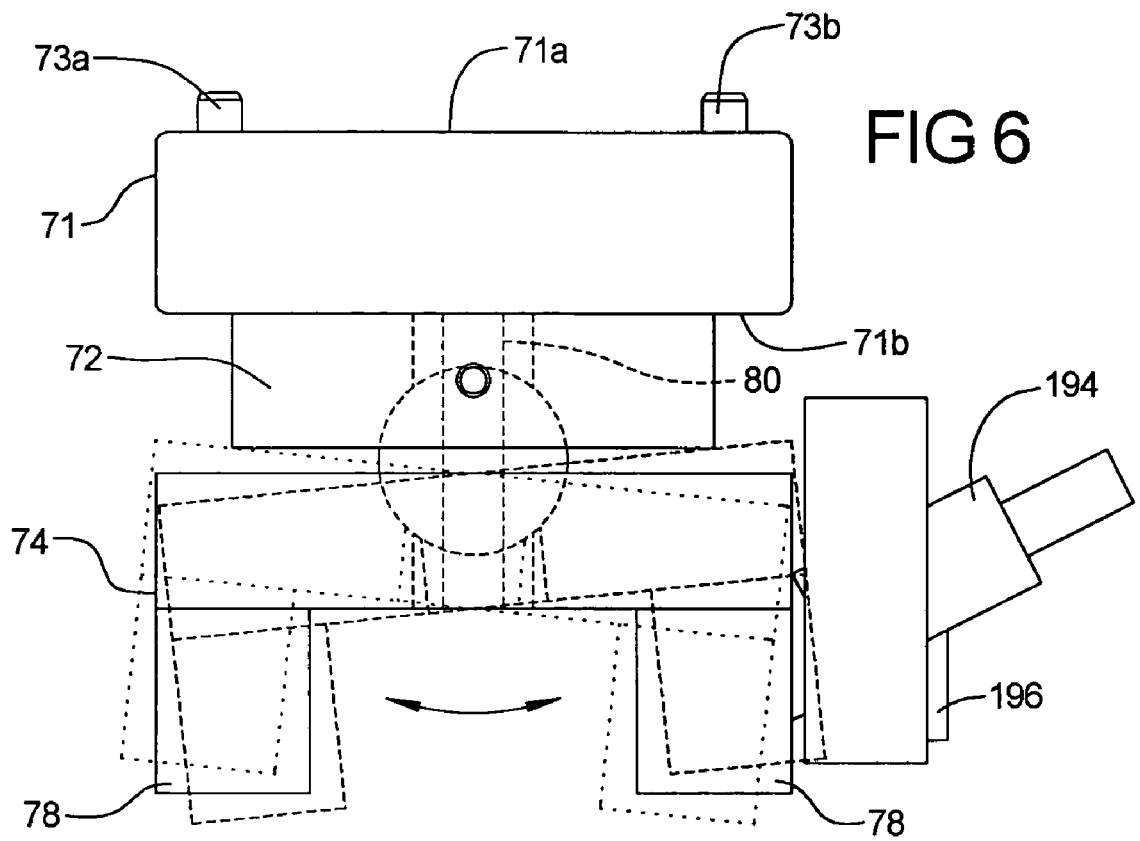
FIG. 6 is a side view of a mono-ball mounting apparatus in accordance with a preferred embodiment of the present disclosure.
Figure 8:
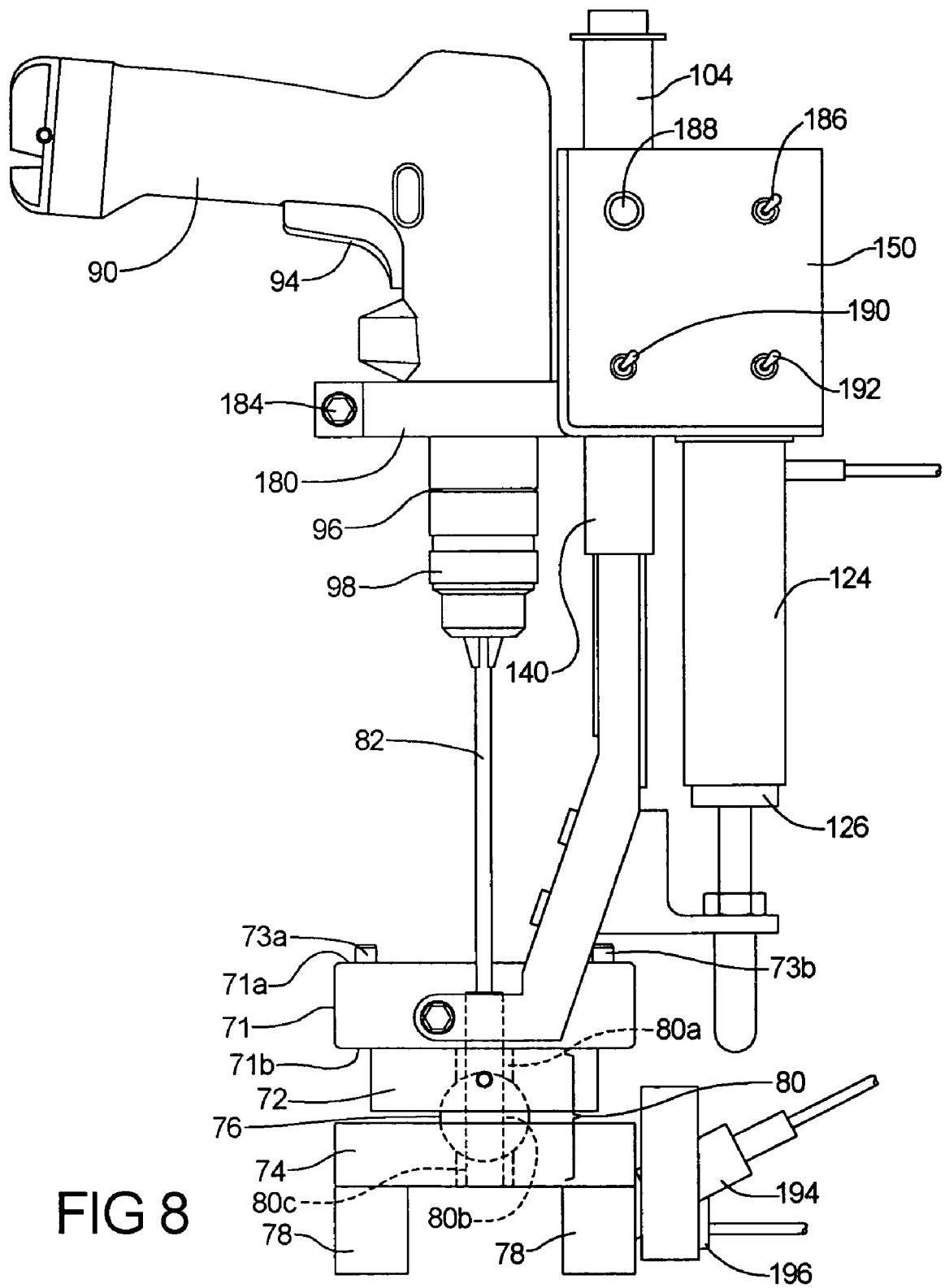
FIG. 8 is a side diagrammatic view of the machining device in an extended position.

More specifically, as shown in FIGS. 2, 5 and 6, mounted to second side 60 of Y-axis carriage 24 is attachment member 71, having a top side 71a and a bottom side 71b. Referring to FIGS. 6 and 8, attachment member 71 includes a first guiding pin 73a and a second guiding pin 73b coupled to top side 71a. First guiding pin 73a and second guiding pin 73b align attachment member 71 with Y-axis carriage 24. Bottom side 71b of attachment member 71 is affixed to drill plate 72. Drill plate 72 is coupled to mounting unit 74 having a mono-ball device 76, wherein mono-ball device 76 allows mounting unit 74 to follow the contour of surface 16 of work piece 18. Mounting unit 74 may pivot between a plurality of position, such as a first position and a second position, as shown in FIG. 6.

Figure 7:
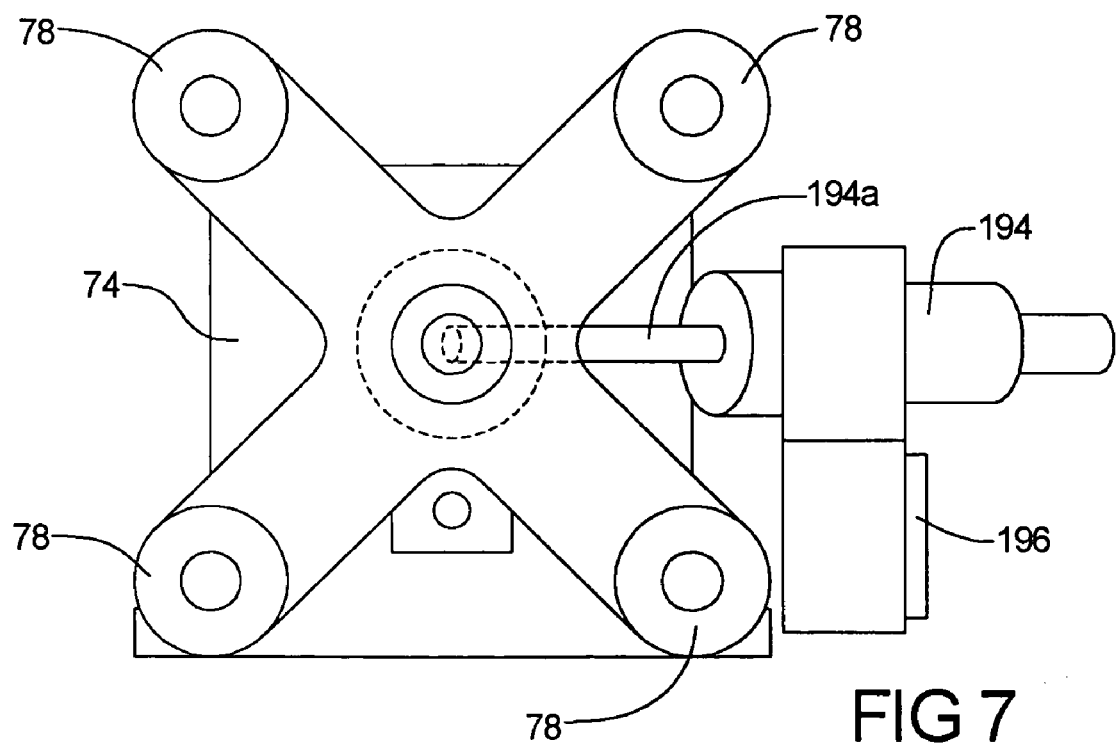
FIG. 7 is a bottom view of the mono-ball mounting apparatus.

Referring to FIGS. 6, 7 and 8, mounting unit 74 includes a plurality of gripping mechanisms or contact feet 78. Contact feet 78 are mounted along each of the opposite edges of mounting unit 74. Contact feet 78 may be made of a polymeric material, such as Delrin®. Additionally, contact feet 78 substantially prevent mounting unit 74 from moving once placed in contact with surface 16 of work piece 18 during a drilling process. Furthermore, drill plate 72, mounting unit 74, and mono-ball device 76 include bores 80a, 80b and 80c, respectively, that are concentrically aligned to form an elongated bore 80 (FIGS. 6 and 8).

Figure 9:
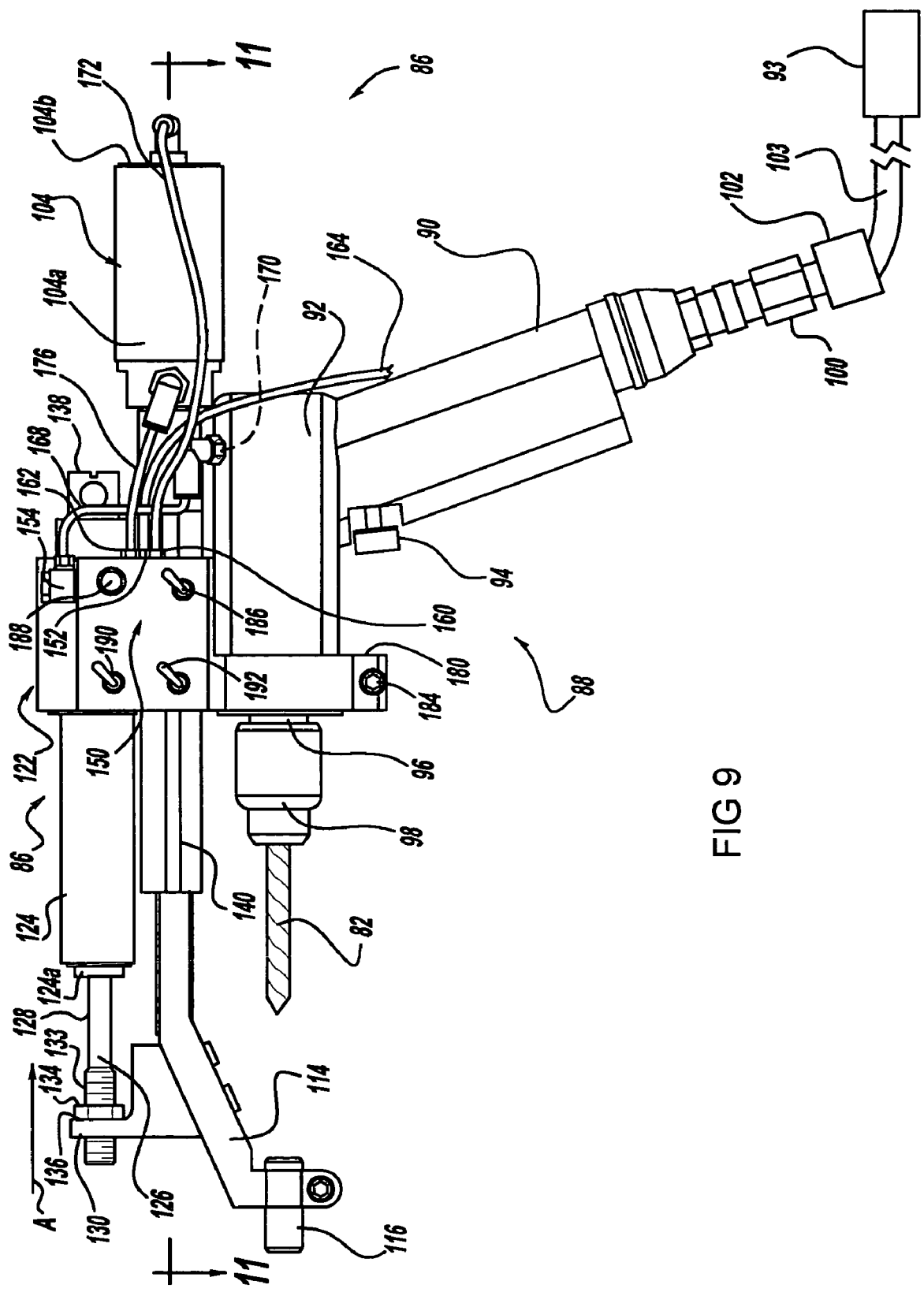
FIG. 9 is a side elevational view of the machining device, without the mono-ball mounting apparatus, in an extended position and constructed in accordance with the teachings of the present embodiment of the present disclosure.
Figure 10:
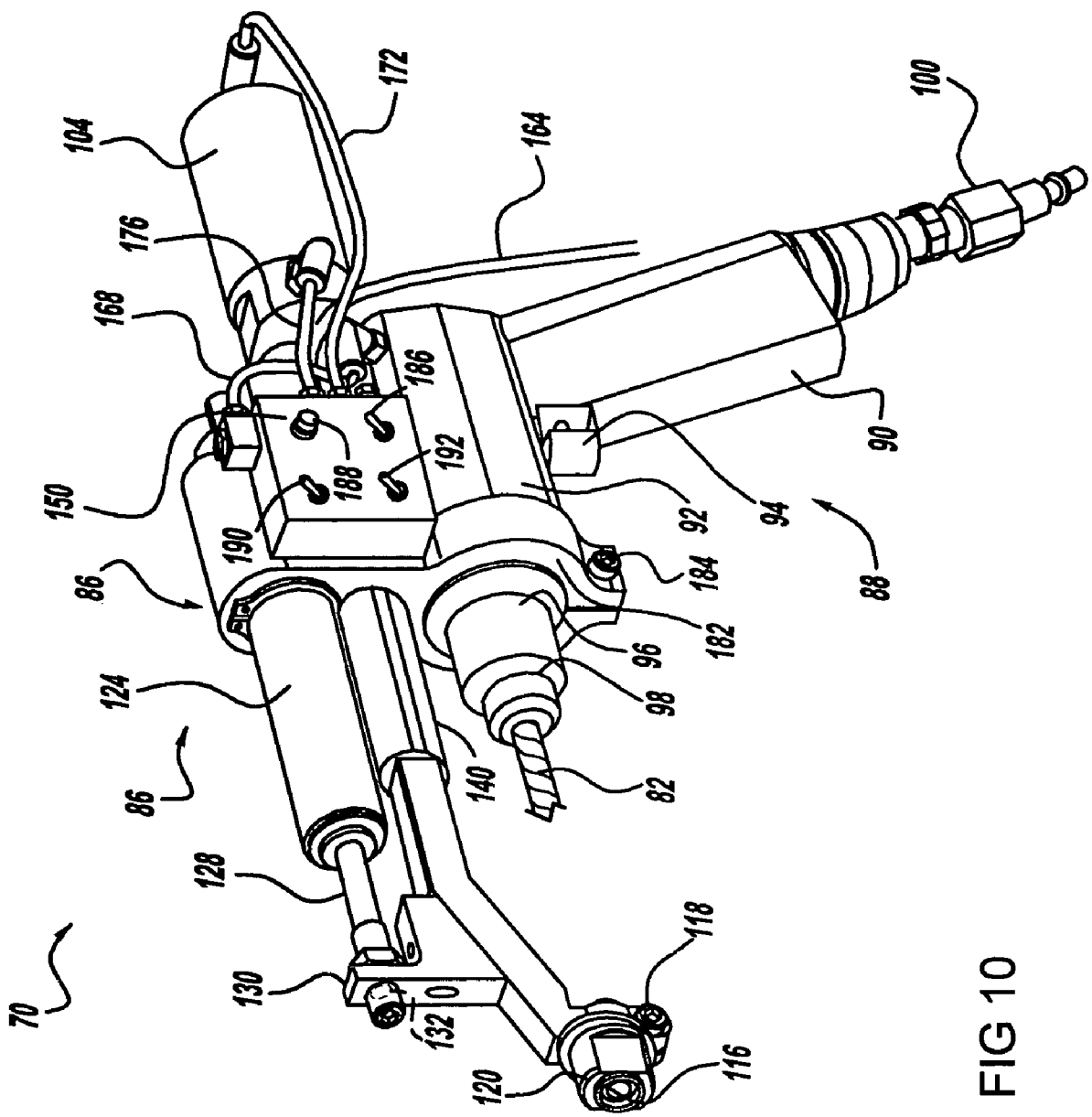
FIG. 10 is a front perspective view of the machining device, without the mono-ball mounting apparatus, in FIG. 9; and, FIG. 11 is a cross-sectional view taken along line 3-3 of FIG. 9.
Figure 11:
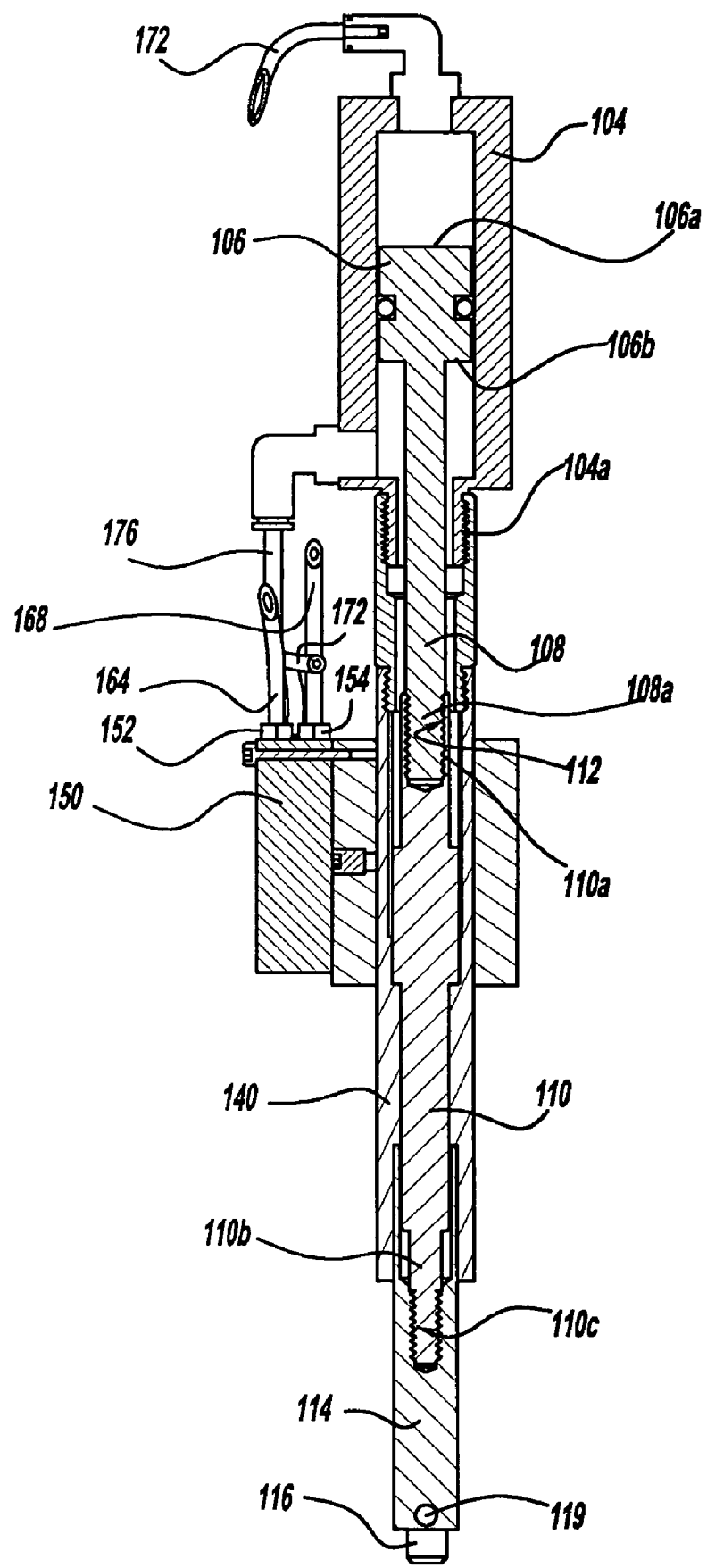

As shown in FIGS. 2 and 8-10, drill 88 generally includes a pistol grip 90 affixed to a motor casing 92. Motor casing 92 encloses a motor (not shown), which is activated by pressing a trigger 94. Activation of the motor conventionally rotates a spindle 96 and a chuck 98. Chuck 98 holds a tool bit 82. Tool bit 82 may be any appropriate tool bit including a drill bit or a countersink bit. Tool bit 82 is capable of passing through each elongated bore 80 to engage surface 16 of work piece 18. Referring to FIGS. 9, 10, and 11, affixed to pistol grip 90 and extending from an end opposite motor casing 92 is a male coupling 100 that connects to a female coupling 102 of a fluid supply hose 103 extending from a power source 93. In particular, the fluid supplied to drill 88 is compressed air. However, drill 88 could alternatively be electrically powered.

Referring to FIG. 10, power feed attachment 86 may be affixed to drill 88 through any suitable means. As an example, yoke or clamp portion 180 extends from housing 140, wraps around motor casing 92, and is held in place by a screw 184.

In FIGS. 9, 10, and 11, power feed attachment 86 is shown to generally include a third-double-acting-air cylinder 104. Third double acting air cylinder 104 is shown in detail in FIG. 11 and may be any conventional double acting air cylinder, such as a 01 Series Micro-Air Cylinder, Part No. 0118-5029-010, manufactured by the ARO Corporation of Bryan, Ohio. Third double acting air cylinder 104 includes an air-driven piston 106 having a first side 106a and a second side 106b. A first piston rod 108 is coupled to air-driven piston 106 and extends from a front portion 104a of double acting air cylinder 104. First piston rod 108 engages an intermediate or connection member 110 through a threaded portion 112 at a forward end 108a of first piston rod 108 and a rearward end 110a of connection member 110. Furthermore, a forward end 110b of connection member 110 includes threads 110c that engage a forward or guide arm 114 of power feed attachment 86. Affixed to guide arm 114 is a bushing 116. Guide arm 114 and bushing 116 guide tool bit 82 during the actuation of drill 88. Bushing 116 may be affixed to guide arm 114 through any suitable means and is shown to be clamped between two portions of guide arm 114 and affixed in place with a screw 118.

Bushing 116 may be any conventional bushing that may be affixed to drill plate 72. Many bushings are available to interact with different drill plates and a proper bushing may be chosen depending upon the application. Referring to FIG. 10, a resilient member 120, which may be formed of any suitable material, may be affixed around bushing 116, and extend in front of bushing 116, to allow a press fit onto work piece 18. According to the present embodiment, resilient member 120 is formed of a polymeric material to reduce movement of power feed attachment 86 during use.

With further reference to FIGS. 9 and 10, power feed attachment 86 also includes a control system 122 including a hydraulic cylinder 124 having a front end 124a with a front portion 126 of a second piston rod 128 extending therefrom. Control system 122 also includes a variable connection or attachment member 130 that couples second piston rod 128 to guide arm 114. Hydraulic cylinder 124 may be any suitable hydraulic cylinder such as a Slimline Kineschek Feed Control Part No. 1002-31-1 manufactured by Deschner Corporation of Santa Ana, Calif. Front portion 126 of second piston rod 128 engages guide arm 114 through variable attachment member 130. Variable attachment member 130 includes a threaded bore 132 that receives front portion 126 of second piston rod 128. Front portion 126 of second piston rod 128 engages a set screw 133. Set screw 133 is received in threaded bore 132 (FIG. 10) and may be adjusted in and out of threaded bore 132 to adjust the effective length of second piston rod 128. A nut 134 (FIG. 9) engages set screw 133 and acts as a jamb nut against variable attachment member 130 to hold set screw 133 at the desired position. A rear side 136 of variable attachment member 130 engages nut 134 forming a datum surface.

As described herein, when power feed attachment 86 is activated, guide arm 114 is forced away from chuck 98 in the opposite direction of Arrow A to an extended position. Once trigger 94 of drill 88 is pressed, power feed attachment 86 is mobilized and guide arm 114 is drawn towards chuck 98 in the direction of Arrow A to a retracted position. As also described herein, control system 122 controls the rate of movement of guide arm 114 by engaging variable attachment member 130 with set screw 133. Set screw 133 may be adjusted rearwardly or forwardly in threaded bore 132 to adjust the distance of retraction depending upon the application in which machining device 70 will be used. Referring to FIG. 9, an adjustment screw 138 allows a varying resistance to be produced by hydraulic cylinder 124. Adjustment screw 138 allows resistance produced by hydraulic cylinder 124 to be adjusted so that rate of the retraction of power feed attachment 86 may be precisely controlled.

Referring further to FIGS. 2, 9 and 11, affixed adjacent to a housing 140 of power feed attachment 86 is a module 150. Module 150 includes a valve (not shown). The valve may be any suitable 2-position valve with a spring return such as an Eagle 4-way Valve Part No. E4-1PS00-000 manufactured by the Clippard Instrument Laboratory, Inc. of Cincinnati, Ohio. The valve includes at least a first inlet 152, a second inlet 154, a first outlet 162, and a second outlet 160 (FIGS. 9 and 11). A third-fluid-supply line 164 (FIGS. 9 and 11) connects a second outlet 41b of air fitting 41 to first inlet 152. Alternatively, third-fluid-supply line 164 may be coupled to male coupling 100 to transport fluid or compressed air from power supply 93 to first inlet 152 of module 150. A second inlet line 168 connects a second bore 170 (FIG. 9) formed in motor casing 92 to second inlet 154. Second bore 170 in motor casing 92 is drilled through the outside cast wall of motor casing 92. Second bore 170 reaches an internal cavity (not shown) that becomes pressurized when trigger 94 is pressed.

A first-outlet-drive line 172 (FIG. 9) connects first outlet 162 and a rear portion 104b of third-double-acting-air cylinder 104. A second-outlet-drive line 176 connects front portion 104a of third-double-acting-air cylinder 104 to second outlet 160. Referring briefly to FIGS. 9 and 11, first-outlet-drive line 172 provides fluid to first side 106a of air-driven piston 106 while second-outlet-drive line 176 provides fluid to second side 106b of air-driven piston 106.

Additionally, module 150 includes a third-actuating control 186 and a fourth-actuating control 188. Third-actuating control 186 includes a spring return valve, such as a spring return valve Part No. D20-SM-K0-A manufactured by Dynamco, Inc. Third-actuating control 186 is coupled to the valve and fourth-actuating control 188. Third-actuating control 186 includes a first position and a second position. Third-actuating control 186 is operative to channel fluid from first outlet 162 to an input of fourth-actuating control 188 and vice versa. Third-actuating control 186 is adaptive to allow spindle 96 to be advanced toward surface 16 of work piece 18 without using trigger 94 or without spindle 96 rotating. When activated, fourth-actuating control 188 is operative to channel fluid from an output of the fourth-actuating control 188 to second outlet 160, thereby providing fluid to second side 106b of air-driven piston 106 and causing advancement of spindle 96 toward surface 16 of work piece 18.

Referring to FIGS. 2, 9 and 11, air fitting 41 is constantly powered or pressurized by the air coming from the air supply, as previously mentioned. Therefore, third-fluid-supply line 164 provides a constant source of pressurized air or power to module 150 of power feed attachment 86. Additionally, module 150 allows the constant pressure of air provided through third-fluid-supply line 164 to travel through module 150 and out first-outlet-drive line 172 to rear portion 104b of third-double-acting-air cylinder 104. Due to the air being constantly supplied to third-double-acting-air cylinder 104, air-driven piston 106 is placed in the extended position, as shown in FIGS. 9, 10, and 11. In turn, this maintains guide arm 114 in the extended position, which is distal from chuck 98, and bushing 116 at a maximum allowable distance from chuck 98.

Drill 88 in this example is a pneumatic powered drill. Pressurized air is received through male coupling 100 and then travels through drill 88 to power the motor to rotate chuck 98. When an operator of drill 88 presses trigger 94, pressurized air travels to motor casing 92 and powers the motor. When air enters motor casing 92, air also pressurizes second inlet line 168 through second bore 170. Second bore 170 in motor casing 92 allows air to travel out of motor casing and into the valve of module 150. Thereafter, the valve of module 150 transfers the pressurized air from first-outlet-drive line 172 to second-outlet-drive line 176. When this occurs, front portion 104a of third-double-acting-air cylinder 104, and second side 106b of air-driven piston 106, become pressurized. This drives air-driven piston 106 in a rearward position towards rear portion 104b of third-double-acting-air cylinder 104, as shown in FIG. 11. Therefore, the mobilized position of machining device 70 is the retracted position.

In particular, the retracted position moves bushing 116 in the direction of Arrow A to dispose bushing 116 nearer chuck 98. Thus, retraction of first piston rod 108 into cylinder portions of double acting air cylinder 104 cause drill spindle 96 to be advanced toward work piece 18, and extension of first piston rod 108 causes drill spindle 96 to be retracted away from work piece 18. If power feed attachment 86 includes no controlling mechanisms, the movement from the extended to the retracted position would be almost instantaneous. This is because the air pressure is simply diverted from first side 106a to second side 106b of air-driven piston 106 allowing guide arm 114 to retract toward chuck 98 as rapidly as the pressure of the air allows.

When an operator initiates third-actuating control 186 to deactivate spindle 96, module 150 prevents spindle 96 from rotating. Using fourth-actuating control 188, spindle 96 may be advanced without rotation toward surface 16 of work piece 18. Additionally, fourth-actuating control 188 allows spindle 96 to be incrementally advanced by selectively engaging and disengaging fourth-actuating control 188. When this occurs, module 150 pressurizes front portion 104a of third-double-acting-air cylinder 104 and second side 106b of air-driven piston 106. This drives air-driven piston 106 in the retracted position towards rear portion 104b of third-double-acting-air cylinder 104.

Control system 122 controls the rate of retraction of guide arm 114. In particular, hydraulic cylinder 124 of control system 122 provides hydraulic resistance through second piston rod 128 and variable attachment member 130. As guide arm 114 is drawn towards chuck 98, guide arm 114 interacts with hydraulic cylinder 124. The resistance in hydraulic cylinder 124 controls the retraction of guide arm 114 towards chuck 98. Set screw 133 may also be adjusted to set the maximum distance of retraction of guide arm 114 towards chuck 98. Moving set screw 133 in threaded bore 132, changes the effective length of second piston rod 128. If set screw 133 is made to decrease the effective length of second piston rod 128, then there is less distance for second piston rod 128 to travel in hydraulic cylinder 124 thereby decreasing the distance that guide arm 114 may travel.

Adjustment screw 138 allows the resistance produced by hydraulic cylinder 124 of control system 122 to be adjusted. Increasing the resistance created by hydraulic cylinder 124 decreases the rate of the retraction of guide arm 114 towards chuck 98. Whereas, reducing the resistance of hydraulic cylinder 124 increases the retraction rate of guide arm 114 towards chuck 98. Various applications require differing rates of feed of tool bit 82 through work piece 18. Adjustment of set screw 133 also allows for a precise depth of tool bit 82 into work piece 18. Therefore, a continuous and easily repeated rate and depth of tool bit 82 into work piece 18 is reproduced by simply adjusting set screw 133 and adjustment screw 138 of power feed attachment 86.

Additionally, module 150 includes a laser-actuating control 190 and an incandescent light actuating control 192. Laser-actuating control 190 is coupled to a laser source 194, such as a laser diode, to guide or aid an operator to properly align machining device 70 with a desired location to drill a hole. As shown in FIG. 7, laser source 194 emits a laser light in a direction of surface 16 of work piece 18. Incandescent light actuating control 192 is coupled to an incandescent or non-coherent light source 196 that guides and assists the operator in drilling a hole on surface 16 of work piece 18.

Referring to FIG. 2, machining device 70 includes a vacuum collection hose 198. Vacuum collection hose 198 is coupled to mounting unit 74. Vacuum collection hose 198, in turn, is coupled to a vacuum generator (not shown). Vacuum collection hose 198 suctions loose debris and shavings around a desired location selection for drilling.

During the operation of positioning machining device 70, an operator places rail 12 adjacent to a fabricated hole pattern located on surface 16 of work piece 18 to be drilled. The hole pattern may have been previously determined by, for example, a laser projection or spray dot templates. The operator activates the air powered vacuum generators to securely pull rail 12 down to surface 16 of work piece 18.

Carriage system 19 is then slid along the X-axis and the Y-axis to position and align machining device 70 over the marked locations. After sliding carriage system 19 onto rail 12, machining device 70 is coupled to carriage system 19 via tooling knob 84. Using the controller, the operator may select and activate a full clamp feature or function, a partial clamp feature or function, or a full unclamp feature or function. Toggling the first-actuating control of the controller activates the partial clamp function to bias the first valve into a first position. The partial clamp function channels fluid away from the second-air output to the first-air output of the controller to vacuum cup assembly 64 such that neither the first side nor the second side of the air-driven piston within double acting cylinders 26 receives fluid from the controller. This allows Y-axis carriage 24 to move slightly along the Y-axis. Additionally, during activation of the partial clamp function, fluid is also supplied to vacuum cup assembly 64. This causes vacuum cup assembly 64 to act as an air float device that allows carriage system 19 to move along the X-axis.

Switching the first-actuating control of the controller to a second position initiates the full clamp function to bias the first valve from the first position into a second position. The full clamp function occurs when fluid is channeled away from first-air output to the second output of the controller and is applied to the second side of the air-driven piston causing first piston rod 30 to retract into double acting cylinders 26. Retracting the first piston rod 30 of each double acting cylinder 26 causes Y-axis carriage 24 to brace against X-axis carriage 20 substantially preventing movement in the Y-axis.

On the other hand, toggling the second-actuating control of the controller to a first position activates the full unclamp function to bias the second valve into a first position. The full unclamp function is indicative of fluid being supplied from the third-air output to the first side of the air-driven piston. This causes a previously supplied force applied to Y-axis carriage 24 to be released which allows full movement of carriage system 19 along the X-axis and the Y-axis. Additionally, switching the second-actuating control of the controller to a second position initiates the full clamp function to bias the second valve into a second position. This causes fluid to be channeled away from the third-air output to the fourth air output and to the vacuum generator of vacuum cup assembly 64 causing the vacuum cup assembly 64 to adhere to surface 16.

Once machining device 70 is properly positioned, the operator toggles the first-actuating control to the second position for the full clamp function to cause double acting cylinders 26 to clamp Y-axis carriage 24 to X-axis carriage 20. Clamping Y-axis carriage 24 to X-axis carriage 20 also forces all four contact feet 78 of mounting unit 74 against surface 16 to cause friction between contact feet 78 and the surface 16 to prevent movement of carriage system 19 in the X-axis and the Y-axis. In order to remain normal to the contour of surface 16 of work piece 18, mounting unit 74 pivots in any direction necessary. Additionally, the operator toggles the second-actuating control to the second position for the full clamp function to supply fluid to the vacuum generator for the vacuum cup assembly 64. The vacuum generator reduces the pressure of a gas in vacuum cup assembly 64 thereby causing an increase in vacuum within vacuum cup assembly 64 to further prevent movement along the X-axis. With dual acting cylinders 26 and vacuum cup assembly 64 activated, carriage system 19 is sufficiently secure to prevent movement along the X-axis and the Y-axis while machining device 70 manipulates surface 16 of work piece 18.

To help locate a previously marked hole of the hole pattern, laser source 194 is provided to further position tool bit 82 to the exact location of the desired marked hole of work piece 18. Laser source 194 also facilitates precise positioning of machining device 70 relative to a location where a machining operation is to be performed. Additionally, incandescent light source 196 is further used to aid the operator to align machining device 70 with the hole pattern.

The operator may also toggle third-actuating control 186 of module 150 to a second position to advance spindle 96 without using trigger 94 or causing spindle 96 to rotate. Once third-actuating control 186 is switched to the second position, fluid is channeled from first outlet 162 to the input of fourth actuating control 188. As the fourth-actuating control 188 is activated, spindle 96, without rotating, is advanced toward surface 16. The operator may advance spindle 96 toward surface 16 of work piece 18 using fourth-actuating control 188. As long as the operator activates fourth-actuating control 188, spindle 96 will continue to advance toward surface 16 of work piece 18 until second piston rod 128 has reached a maximum retraction travel distance and guide arm 114 stops the travel towards the retracted position. When the operator deactivates fourth-actuating control 188, spindle 96 will remain in its current position until the operator toggles third-actuating control 186 into the first position or presses trigger 94. If the operator presses trigger 94 while third actuating control 186 is placed in the second position, spindle 96 will begin to rotate and advance toward surface 16 of work piece 18 to manipulate surface 16. On the other hand, if the operator sets third-actuating control 186 in the first position, third-actuating control 186 channels fluid from the input of fourth-actuating control 188 to first outlet 162, thereby causing fluid to return to the first side 106a of air-driven piston 106 and drives guide arm 114 toward the extended position.

Additionally, during the drilling operation the operator of machining device 70 moves machining device 70 through a feed cycle. The feed cycle includes an extended position to retracted position to extended position action. Power feed attachment 86 performs the entire cycle while the operator has to hold drill 88 and operate trigger 94. Once guide arm 114 has retracted enough towards chuck 98, second piston rod 128 has reached a maximum retraction travel distance, bushing 116 and guide arm 114 stop the travel towards the retracted position. When the retracted motion has stopped, the operator of machining device 70 may release trigger 94 to stop the drilling process. Additionally, when trigger 94 has been released motor casing 92 is no longer pressurized with air from power source 93. Therefore, second bore 170 is also not pressurized, thus removing pressure from second inlet line 168 of module 150.

Upon detection of the removal of pressure from second inlet line 168, module 150 transfers air from third-fluid-supply line 164 and out first-outlet-drive line 172 to pressurize first side 106a of air-driven piston 106. This drives air-driven piston 106 towards front portion 104a of third-double-acting-air cylinder 104 and drives guide arm 114 towards the extended position. In this way, third-double-acting-air cylinder 104 provides pneumatic power to move power feed attachment 86 between the retracted and extended positions. The pneumatic power provided by third-double-acting-air cylinder 104 helps ensure that enough power is provided for extended usage and reduced maintenance or cleanings of the present disclosure. In particular, the pneumatic power provided to third-double-acting-air cylinder 104 provides enough power or force to overcome most general resistances which may form in third-double-acting-air cylinder 104 due to foreign materials entering the cylinder or foreign materials entering housing 140.

Control system 122 also allows for an easily repeatable rate of retraction. Once the retraction rate has been set, using hydraulic cylinder 124 and adjusting the resistance with adjustment screw 138, machining device 70 will always advance with the rate that has been chosen. Therefore, power feed attachment 86 may be adjusted to provide a repeatable, predetermined rate of retraction allowing that rate to be applied to guide arm 114 to move machining device 70. Additionally, the use of variable attachment member 130 and second piston rod 128 allows for an easily repeatable depth of tool bit 82 into work piece 18. Therefore, the operation of machining device 70 is easily repeatable with minimal control being necessary from an operator. For exemplary purposes only, a repeatable countersink variance of about 0.0015 inches (0.0381 mm) in hole diameter and 0.007 inches (0.178 mm) in countersink diameter was achieved when a counter sink tool bit was used. Also as an example, if a drill bit is chosen as tool bit 82, a diameter of about 1.61 mm (0.063 inches) may be used with this embodiment.

Many modifications and other embodiments will come to mind to one skilled in the art to which this disclosure pertains having the benefit of the teachings presented in the foregoing description and the associated drawings. For example, while rail 12 in the illustrated embodiment achieves relative flexibility about one axis and relative stiffness about a perpendicular axis by virtue of its width being much greater than its thickness, it will be recognized that there are other ways of achieving this characteristic. As an example, while rollers 22 are shown for engaging rail 12, other types of members could be used instead of rollers 22 for engaging the rail. Moreover, more than one rail may be used, although not all of the benefits of the one rail system may be achieved with multiple rails. Additionally, attachment member 71 may be eliminated and drill plate 72 may be directly attached to Y-axis carriage 24. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

While various preferred embodiments have been described, those skilled in the art will recognize modifications or variations that might be made without departing from the inventive concept. The examples illustrate the disclosure and are not intended to limit it. Therefore, the description and claims should be interpreted liberally with only such limitation as is necessary in view of the pertinent prior art.

What is claimed is:

1. An apparatus comprising:
   an elongated flexible rail including a plurality of attachment devices adapted to releasably attach the rail to a work piece, the rail includes a longitudinal axis and a transverse axis;
   a main carriage operatively coupled to the rail to be longitudinally moveable;
   a secondary carriage operatively coupled to the main carriage to be transversely moveable and adapted to receive a machining device; and,
   a fastening device coupling the main carriage and the secondary carriage and adapted to clamp the secondary carriage downward to the main carriage, wherein the main carriage and the secondary carriage are substantially braced against one another to prevent the secondary carriage from moving;
   a coupling device operatively associated with the secondary carriage and operative to releasably affix the secondary carriage to the surface of the work piece by vacuum; and
   a controller in operative communication with said coupling device and adapted to control said coupling device so that said coupling device is used to place said secondary carriage and said main carriage in any one of a fully clamped state relative to said work piece, a fully unclamped state relative to said work piece, and a partially clamped state relative to said work piece.

2. The apparatus of claim 1, wherein the fastening device comprises a cylinder having a housing, a piston and a rod, the housing being fixedly coupled to the coupling structure, the piston being disposed within the housing and movable between a first position and a second position, the rod being coupled for movement with the position.

3. The apparatus of claim 1, further comprising a machining device disposed on the secondary carriage and adapted to manipulate a surface of a work piece, wherein the main carriage and the secondary carriage are used to locate and position the machining device adjacent to a desired location on the surface of the work piece.

4. The apparatus of claim 1, wherein the machining device comprises a power feed attachment device having a drill, wherein the power feed attachment device is operative to advance a spindle of the drill toward the surface of the work piece without the spindle rotating.

5. The apparatus of claim 4, further comprising a mono-ball mounting unit coupled to the power feed attachment device, wherein the mono-ball unit is operative to pivot and enable the main carriage to be maintained generally parallel to the surface of the work piece.

6. The apparatus of claim 1, wherein said coupling device is coupled to an end of the secondary carriage and operative to releasably affix the secondary carriage to the surface of the work piece by vacuum.

7. The system of claim 1, further comprising a plurality of contact units for supporting the machining device and for providing substantial friction against the surface of the work piece to aid in preventing the machining device from moving during manipulation.

8. An apparatus comprising:
- an elongated flexible rail including a plurality of attachment devices adapted to releasably attach the rail to a work piece, the rail having a longitudinal axis and a transverse axis, wherein the rail bends and twists as needed to substantially follow a surface of the work piece;
- an X-axis carriage operatively coupled to the rail and adapted to move along the rail along an X-axis, wherein the X-axis is parallel to a length of the rail;
- a Y-axis carriage coupled and adapted to traverse the X-axis carriage along a Y-axis, wherein the Y-axis is perpendicular to the X-axis, and wherein the Y-axis carriage is adaptive to couple to a machining device, and,
- a coupling device coupled to the Y-axis carriage and adapted to substantially affix the Y-axis carriage to the work piece by vacuum; and
- a controller for controlling said coupling device such that said coupling device secures said X-axis carriage and said Y-axis carriage stationary relative to said work piece, said controller adapted to position said X-axis and Y-axis carriages in any one of a fully secured condition relative to said work piece, a fully unsecured condition relative to said work piece, and a partially secured condition relative to said work piece.

9. The apparatus of claim 8, wherein the Y-axis carriage is coupled to the X-axis carriage via a fastening device adapted to clamp the Y-axis carriage downward to the X-axis carriage, wherein the X-axis carriage and the Y-axis carriage are substantially braced against one another to prevent the Y-axis carriage from moving along the Y-axis.

10. The apparatus of claim 8, further comprising a machining device having pivotal mounting system and being coupled to the Y-axis carriage, such that the machining device is adapted to pivot and enable the X-axis carriage to follow the contour to the surface of the work piece, and wherein the machining device is operative to manipulate a surface of the work piece.

11. The apparatus of claim 10, wherein the machining device further comprises a light source to guide and align the machining device adjacent to the surface of the work piece to facilitate precise positioning of the machining device relative to a location where a machining operation is to be performed.

12. The apparatus of claim 11, further comprising a vacuum hose coupled to the machining device and adaptive to suction loose debris and shavings around a desired area of the work piece for manipulation by the machining device.

13. The carriage system of claim 8, further comprising a handle device coupled to the X-axis carriage for aiding an operator to position the machining device along the X-axis.

14. The carriage system of claim 8, further comprising a handle device coupled to the Y-axis carriage and adapted to aid an operator to position the machining device along the Y-axis.

* * * * *

UNITED STATES PATENT AND TRADEMARK OFFICE
CERTIFICATE OF CORRECTION

PATENT NO. : 7,578,642 B2  
APPLICATION NO. : 11/198942  
DATED : August 25, 2009  
INVENTOR(S) : Fritsche et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1048 days.

Signed and Sealed this

Seventh Day of September, 2010

David J. Kappos  
*Director of the United States Patent and Trademark Office*